Jan. 24, 1967    G. DE COYE DE CASTELET    3,299,996
SHOCK-ABSORBERS FOR VEHICLE SUSPENSIONS
Filed Feb. 8, 1965    2 Sheets-Sheet 1

Fig_1

Inventor
Gaetan DeCoye DeCastelet
By Stevens, Davis, Miller & Mosher
Attorneys 3,299,996
SHOCK-ABSORBERS FOR VEHICLE SUSPENSIONS
Gaëtan de Coye de Castelet, Billancourt, France, assignor to Regie Nationale des Usines Renault, Billancourt, France
Filed Feb. 8, 1965, Ser. No. 431,008
Claims priority, application France, Feb. 18, 1964, 964,217, Patent 1,394,180; Dec. 24, 1964, 1, Patent 87,129
2 Claims. (Cl. 188—88)

The present invention relates to a fluid-type shock-absorber for the suspension of a vehicle wheel, of the kind comprising a cylinder and a piston forming a chamber provided with a passage for the flow of fluid displaced by the relative movement of the cylinder and the piston, and on which is mounted a control valve.

While it is generally applicable to any shock-absorber of the kind specified above, the invention is more particularly and advantageously applied to suspensions of great flexibility, such as hydro-pneumatic suspensions, in which it is known to obtain the desired damping by placing the said control valve in the hydraulic jack which co-operates with the pneumatic cushion forming the suspension spring.

It is known that, in order to obtain a high degree of smoothness of travel, there must then be formed in the control valve permanent leakage passages having as large a section as possible, the limit being that at which the damping of the movements of the wheel and the body becomes insufficient, the result of which on a bad road is the appearance of wheel oscillations and, when passing over obstacles of large size, violent shocks on the abutments which limit the amplitude of oscillation of the suspension system.

The present invention permits the use of permanent leakage passages of relatively large section, at the same time obviating the above-mentioned drawbacks.

In accordance with a characteristic feature of the invention, the said control valve comprises two parts respectively coupled to the two elements, cylinder and piston, of the shock-absorber in order to follow their relative movements, these two parts having corresponding passageways which are placed in coincidence in the mean position of rest of the cylinder-piston unit, so that the section of passage of the fluid becomes smaller as the cylinder-piston unit moves away from the said mean position of rest.

In a preferred form of construction, one of the parts of the valve is rigidly fixed to one of the said elements while the second part is elastically coupled to these two elements by two spring couplings, the flexibilities of which are in a ratio in the vicinity of that of the respective oscillation amplitudes provided for this second part and for the second of the said elements, which permits the construction of the valve with smaller overall dimensions than those which would be necessary for the cylinder-piston movement in the case of a rigid coupling between these latter and the constituent parts of the valve.

In addition, by arranging matters so that the above-mentioned spring systems and the second part are such that their natural frequency of oscillation is tuned to the natural frequency of the phenomenon of wheel oscillation, it is then possible, as will be explained later, to obtain for the wheel oscillations a substantial damping for the small corresponding amplitude of oscillation of the wheel.

An alternative form of embodiment of the invention resides essentially in the servo-control of the moving part of the valve, not only by the displacement of the piston but also by its speed of movement, by the addition to the moving part of a deflector or disc having a diameter less than that of the cylinder and which forms an annular section of passage.

Figure 1:
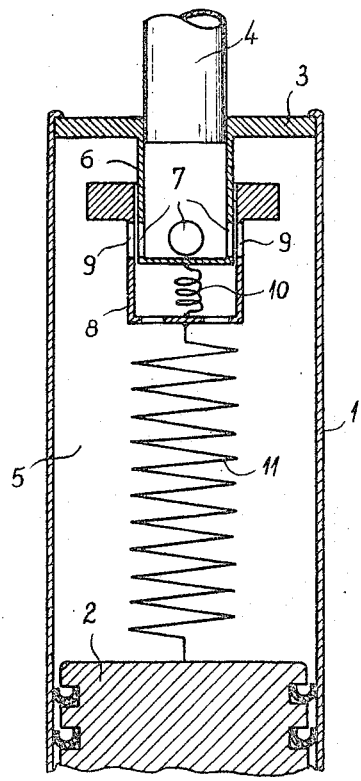
FIG. 1 shows one form of embodiment of the invention given by way of example within the framework of its application to a suspension of the hydro-pneumatic type, FIG. 1 showing a partial view in axial cross-section of the hydraulic jack of the said suspension.

Referring now to FIG. 1, it can be seen that the hydraulic jack of the wheel suspension shown comprises a cylinder 1 in which slides a piston 2 intended to be coupled to a wheel (not shown) of the vehicle, while the cylinder 1 is intended to be fixed on the body (not shown) of the vehicle.

The cylinder 1 comprises an end 3 to which is coupled a pipe 4 intended to connect the chamber 5 formed between the cylinder and the piston to a chamber outside the cylinder 1 (not shown) and which in known manner comprises a moving wall common to this chamber and to the pneumatic cushion forming the suspension spring.

The end 3 of the cylinder forms, at the point of coupling to the tube 4, a sleeve 6 with a closed end and provided with lateral holes 7 constituting one of the parts of a valve, a second part of which is constituted by a sleeve 8 slidably mounted on the first-mentioned sleeve and provided with lateral holes 9 corresponding to the holes 7 of the sleeve 6.

The moving sleeve 8 is coupled elastically on the one hand by means of a spring 10 to the bottom of the sleeve 6, that is to say to the bottom of the cylinder 1 and on the other hand by means of a spring 11 to the piston 2. These springs are such that for the mean position provided between the cylinder and the piston in the position of rest of the suspension, the holes 7 and 9 of the sleeves are in coincidence, any suitable guiding device being provided between the two sleeves.

The flexibilities of the springs 10 and 11 are chosen in the ratio of the maximum amplitudes of oscillation provided for the sleeve 8 and the piston 2 in the cylinder, which means that the flexibility of the spring 10 is substantially less than that of the spring 11.

In addition, these flexibilities and the weight of the moving sleeve 8 are chosen in such manner that the sleeve-springs unit has a natural frequency of oscillation corresponding to the natural frequency of oscillation of the wheel suspension considered.

The operation of this device is as follows:

At rest, for a normal fore-and-aft trim of the vehicle, the holes 7 and 9 of the sleeves being facing each other, the chamber 5 communicates with the tube 4 through the entire section of passage constituted by these holes.

When there is a relative movement of the body with respect to the wheel, that is to say a relative movement of the cylinder 1 and the piston 2 of appreciable amplitude, the sleeves 6 and 8 are given a simultaneous relative movement such that the holes 7 and 9 become more displaced with respect to each other as the amplitude of the relative movement between the cylinder and piston becomes greater, so that the flow of the fluid and therefore the damping of this movement becomes increasingly braked as the unit approaches the predetermined limits of movement. For example, the section of overlap of the holes will be in the vicinity of zero when the wheel suspension comes into contact with the limit stops which it is usual to provide.

On bad roads, such as those with undulating surfaces, the wheel suspension considered is then liable, following a well-known phenomenon, to oscillate at its natural frequency while at the same time remaining in a position for which the cylinder and the piston 2 are in the vicinity of their normal mean position, that is to say at which the holes 7 and 9 will remain substantially in coincidence, and therefore will not substantially damp-out this phenomenon if it were not for the fact that the natural frequency of the unit comprising the sleeve 8 and the springs 10 and 11 is thus tuned, as has been previously stated, to the natural frequency of oscillation of the wheel suspension. The result is that the said unit, excited by the wheel oscillations, then comes into resonance and as in such a case the excitation and the movement are de-phased by a quarter of a period, the section of passage of the fluid through the holes 7 and 9 will be at its maximum when the piston 2 is at the dead centre of its oscillation travel and at its minimum when the speed of travel of the piston passes through its maximum value, so that a powerful damping of the said oscillation phenomenon can then be obtained, without furthermore adversely affecting the smoothness of running resulting from the lower damping provided in the absence of such a phenomenon.

Figure 2:
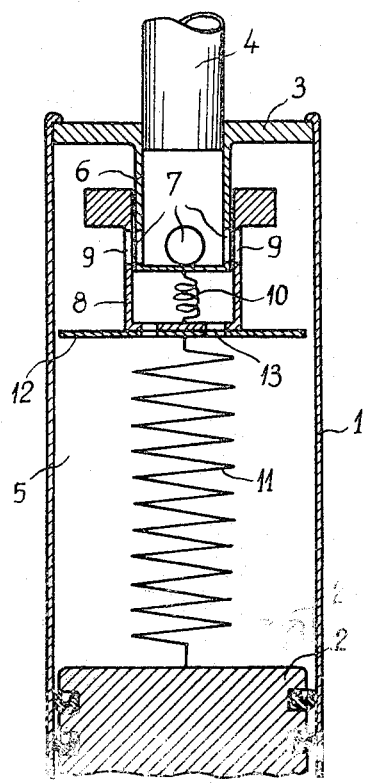
FIG. 2 is a cross-section taken along a plane passing through the axis of the cylinder of the damping device comprising an alternative form of embodiment of the invention.

In the alternative form of construction shown in FIG. 2, it can be seen that the damping system comprises, as in the previous arrangement, a cylinder 1 and a piston 2 connected to a wheel, the cylinder 1 being intended to be fixed on the chassis or the body of the vehicle.

The end 3 of the cylinder is coupled to the tube 4 connecting the chamber 5 of the cylinder to a chamber outside the cylinder which, in suspensions of the hydro-pneumatic type comprises a moving wall common to that chamber and to the pneumatic cushion which forms a suspension spring. The end 3 is fitted with the sleeve 6 with a closed end of the valve, this sleeve being provided with lateral openings 7 while the moving part of the valve is constituted by the sleeve 8 with lateral openings 9. The moving sleeve 8 is coupled elastically on the one hand by the spring 10 to the bottom of the sleeve 6 and on the other hand by the spring 11 to the piston 2 under the conditions previously explained.

The improvement forming the object of the alternative form of embodiment of FIG. 2 consists in adding to the moving part 8 a deflector or disc 12. Orifices 13 are formed in the bottom of the sleeve 8 and of the deflector 12. The deflector 12 is of smaller diameter than the internal diameter of the jack 1.

When the piston 2 moves in one direction or the other, the flow of oil tends to drive the deflector 12 and therefore the sleeve 8 in the same direction, with a force which depends on the instantaneous rate of flow and therefore on the speed of movement of the piston 2.

It is obvious that this action depends on the diameter of the deflector 12; the greater this diameter the more the damping is accentuated. This however does not adversely affect the smoothness of running since, for small displacements, the sleeve 8 can follow the movements of the piston 2 without excessively closing the openings 7 and 9. A certain elasticity may also be given to the deflector, for example by making it as a flexible disc. On the other hand, it is possible to play on the size of the orifices 13 in order to regulate the natural damping of the sleeve 8, that is to say the speed of closure of the openings 7 and 9.

In the limit, it is even possible to eliminate the coupling spring 11 between the part 8 and the piston 2, which on the one hand considerably simplifies the construction and on the other is very advantageous for shock-absorbers of vehicles which do not comprise any trim-corrector system. A construction of a shock-absorber of this kind is shown by way of example in FIG. 3.

This case relates to a liquid shock-absorber with the usual single compensation chamber 14, the partition of this chamber with the passage orifices being shown at 15. The piston 2 carries the moving part or sleeve 6 with lateral openings 7, while inside the sleeve 6 is adapted to slide the sleeve 8 with lateral openings 9, this sleeve 8 being provided in its end wall with orifices 13 and being open at the top; this sleeve 8 carries the deflector 12.

Figure 3:
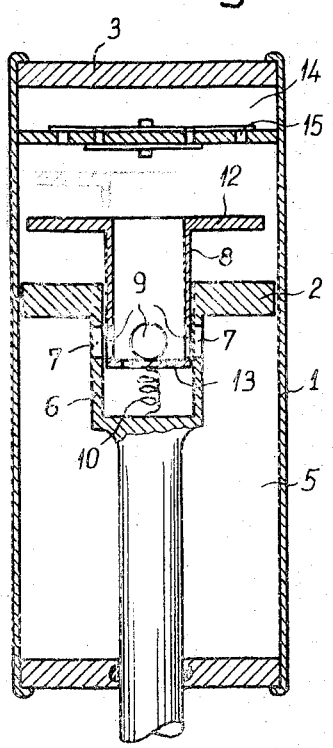
FIG. 3 is an alternative form of the previous arrangement in a particular case.

Between the end of the sleeve 8 and the end wall of the sleeve 6 is again arranged the spring 10. The operation of the shock-absorber explained with reference to FIG. 3 is identical with that previously given for the shock-absorber of FIG. 2 as regards the action of the openings 7 and 9 of the sleeves 6 and 8 and the function of the deflector 12.

Figure 4:
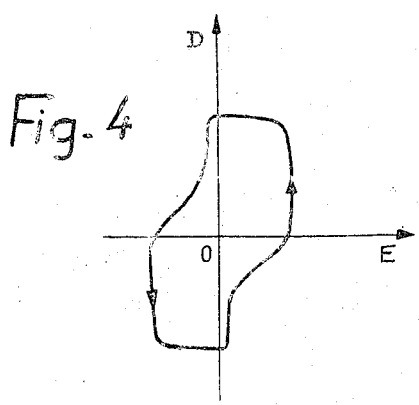
FIG. 4 shows the form of the force-displacement diagram obtained with the shock-absorber of FIGS. 2 and 3 outside the zone of frequency of the wheel oscillations.

There has been shown in FIG. 4 by way of indication the form of the diagram of effort (OE) and displacement (OD) obtained with a shock-absorber of this kind outside the zone of frequency of the wheel oscillations (that is to say corresponding to the resonance of the moving sleeve 8). It can be seen from this diagram that the damping force remains small at the beginning of the displacement travel.

I claim:
1. A fluid-type shock absorber for a vehicle wheel suspension, comprising a cylinder and a piston forming a chamber provided with a passage for the flow of the fluid displaced by the relative movement of the cylinder and the piston, the said passage being provided with a control valve, wherein the said control valve comprises two parts respectively coupled to the two elements, cylinder and piston, of the shock-absorber so as to follow their relative movements, the said two parts having corresponding passages which are located in coincidence in the mean position of rest of the cylinder-piston unit, so that the section of passage of the fluid becomes smaller as the cylinder-piston unit moves away from the said mean position of rest, one of the said parts of the control valve being rigidly coupled to one of the said elements while the second part is elastically coupled to both said elements by two spring connections, the flexibilities of which are in a ratio close to that of the respective oscillation amplitudes provided for said second part and for the second of the said elements.

2. A fluid-type shock-absorber in accordance with claim 1, wherein the flexibilities of the spring connections are such that the natural oscillation frequency of the moving part of said control valve is equal to the natural frequency of the wheel oscillation.

References Cited by the Examiner
UNITED STATES PATENTS

| 2,095,112 | 10/1937 | Wallace | 188—88 |
| 2,252,772 | 8/1941 | Katcher | 188—96 |
| 2,310,570 | 2/1943 | Briggs | 188—88 |
| 2,716,470 | 8/1955 | Focht | 188—88 |
| 2,886,142 | 5/1959 | Orshansky | 188—88 |
| 2,934,175 | 4/1960 | Schnitzer | 188—88 |

FOREIGN PATENTS 713,318   8/1954   Great Britain.

MILTON BUCHLER, *Primary Examiner.*

GEORGE E. A. HALVOSA, *Assistant Examiner.*